United States Patent [19]

Parfree et al.

[11] Patent Number: 4,506,948

[45] Date of Patent: Mar. 26, 1985

[54] CABLE STRAIN MONITORING

[75] Inventors: Colin S. Parfree; Peter Worthington, both of Southampton, England

[73] Assignee: International Standard Electric Corporation, New York, N.Y.

[21] Appl. No.: 388,380

[22] Filed: Jun. 14, 1982

Related U.S. Application Data

[62] Division of Ser. No. 206,427, Nov. 13, 1980, Pat. No. 4,350,046.

[30] Foreign Application Priority Data

Nov. 15, 1979 [GB] United Kingdom ............... 7939607

[51] Int. Cl.³ .................................................. G02B 5/14
[52] U.S. Cl. ...................................... 350/96.23; 174/37
[58] Field of Search ........................ 350/96.23; 174/37

[56] References Cited

U.S. PATENT DOCUMENTS

| | | | |
|---|---|---|---|
| 3,865,466 | 2/1975 | Slaughter | 350/96.23 |
| 4,141,622 | 2/1979 | Beal | 350/96.23 |
| 4,141,623 | 2/1979 | Dubost et al. | 350/96.23 |

FOREIGN PATENT DOCUMENTS

| | | | |
|---|---|---|---|
| 2541178 | 3/1977 | Fed. Rep. of Germany | 96.23/ |
| 44-1754 | 1/1967 | Japan | 174/37 |

OTHER PUBLICATIONS

Mitsunaga et al., "Strain Measurement in Coated . . . Wire", *Trans. of IECE of Japan*, vol. E62, No. 9, Sep. 1979, pp. 620–621.

*Primary Examiner*—John Lee
*Attorney, Agent, or Firm*—John T. O'Halloran; Peter R. Ruzek; Mary C. Werner

[57] ABSTRACT

At least one metallic element is incorporated into a cable during the manufacture of optical fiber cables, along with one or more elongated optical fibers. Such metallic element with its insulation is similar in diameter to an optical fiber with its sheath. The electrical resistance of the metallic element varies very little with temperature, but does vary with strain. Hence, by monitoring the resistance of the metallic element, the strain to which the fibers are subjected can also be monitored.

4 Claims, No Drawings

CABLE STRAIN MONITORING

This is a division of application Ser. No. 206,427, filed Nov. 13, 1980 (now U.S. Pat. No. 4,350,046).

BACKGROUND OF THE INVENTION

The present invention relates to a strain monitoring technique for use, for instance, in the manufacture of optical fibre cables.

Optical fibres are relatively weak when compared with the metallic conductors used in electrical cables so that it is desirable that the fibres be subjected to as little strain as possible while making the cables. Such a cable usually includes a number of separate optical fibres which are assembled into the cable, and an object of this invention is to provide a method of monitoring the strains to which optical fibres are subjected while a cable is being assembled or installed or used when in service.

SUMMARY OF THE INVENTION

According to the invention there is provided a method of monitoring the strain to which the optical fibres of an optical fibre cable are subjected which includes providing the cable with at least one thin metallic element which is assembled with the fibres, the electrical resistance of the material of which this element is made being variable with the strain to which the element is subjected, and monitoring the electrical resistance of the thin metallic element during the assembly of the cable, the result of the monitoring being indicative of the strain to which the cable is and hence the optical fibres are subjected.

DESCRIPTION OF THE PREFERRED EMBODIMENTS

In a multi-fibre cable, each optical fibre has its own cladding which is covered by a sheath of a plastic material, similar to the insulation on a conventional electrical wire. The metallic filament used for the monitoring referred to above is also covered by a sheath of plastic material and its outside diameter is preferably the same as or almost the same as that of a sheathed optical fibre. The preferred material for this filament is an electrical resistance alloy sold under the Registered Trademark CONSTANTAN since its variations of resistance with temperature are low.

During manufacture a current is caused to flow in the filament, and this is connected to a resistance measuring instrument, which can be one of a number of commercially available instruments of this type. Then the variations in resistance of the filament are monitored and if the resistance indicates that the strain is approaching a dangerous level, some remedial action is taken to reduce that strain to a more acceptable level.

If access to both ends of the cable for this monitoring is not convenient, then two such filaments are provided, and joined at one end, with the resistance of the two filaments connected in series being monitored.

Although the method has been described as applied during cable manufacture it is also usable on other occasions when strain monitoring is desirable.

The electrical resistance alloy referred to above, and which is sold under the Registered Trademark CONSTANTAN is an alloy of 55% copper and 45% nickel.

We claim:
1. An optical fibre cable comprising:
   a plurality of optical fibres each having a core surrounded by a cladding, each of said fibers having an outer sheath; and
   at least one metallic element having a sheath, said element having an electrical resistance which is variable gradually with the strain to which the element is subjected for indicating the strain applied to the optical fibers, and said sheath having an outside diameter substantially the same as the outside diameter of each of said sheathed optical fibres.
2. An optical fibre cable as claimed in claim 1 in which said metallic element is composed of an alloy of 55% copper and 45% nickel.
3. An optical fibre cable comprising:
   at least one optical fibre; and
   at least one electrically variable resistance element which is gradually variable with the strain to which the element is subjected.
4. An optical fibre cable comprising:
   at least one optical fibre; and
   means for monitoring the strain to which an optical fibre is subjected including at least one electrical resistance element extending along said at least one optical fibre and having a resistance which varies gradually with the strain commonly applied to said element and said at least one optical fibre.

* * * * *